United States Patent [19] [11] Patent Number: 5,207,132
Goss et al. [45] Date of Patent: May 4, 1993

[54] ELLIPTICAL LOBED DRIVE SYSTEM
[75] Inventors: David Goss; Richard Seidl, both of Rockford, Ill.
[73] Assignee: Textron Inc., Providence, R.I.
[21] Appl. No.: 777,644
[22] Filed: Oct. 16, 1991
[51] Int. Cl.⁵ .............................................. B25B 23/00
[52] U.S. Cl. ....................................... 81/460; 81/121.1; 411/402; 411/403; 411/405
[58] Field of Search ................. 81/121.1, 124.3, 124.6, 81/186, 436, 460; 411/402, 403, 405, 410, 919

[56] References Cited
U.S. PATENT DOCUMENTS

| 3,584,667 | 6/1971 | Reiland | 81/460 |
| 4,006,660 | 2/1977 | Yamamoto et al. | 411/405 |
| 4,246,811 | 1/1981 | Bondhus et al. | 81/436 |
| 4,338,835 | 7/1982 | Simons | 81/436 |
| 4,970,922 | 11/1990 | Krivel | 81/460 |

FOREIGN PATENT DOCUMENTS

| 1249212 | 8/1986 | U.S.S.R. | 411/403 |
| 1188163 | 4/1970 | United Kingdom | 411/402 |

Primary Examiner—James G. Smith
Attorney, Agent, or Firm—Trexler, Bushnell, Giangiorgi & Blackstone, Ltd.

[57] ABSTRACT

There is disclosed a torque transmitting or coupling arrangement for a fastener drive system or the like, wherein the respective externally configured and internally configured components are provided with a series of mating, elliptically curved flutes and lobes. In both the externally and internally configured components, the flutes and lobes are defined by a first series of elliptically curved surfaces which alternate with a second series of elliptically curved surfaces, with the respective surfaces merging smoothly and generally tangentially to define the alternating flutes and lobes on each said component. One of the components, either the externally configured or the internally configured component will preferably have the flutes and lobes thereon generated from ellipses of substantially equal dimension. The other component, of necessity, will have the flutes and lobes generated from ellipses of differing dimensions. It is appreciated of course, that the flutes and lobes on both the internally and externally configured components may be generated from ellipses of unequal dimensions. In addition, in the preferred embodiment, the centers of the various ellipses which define the flutes and lobes fall at the apexes of regular hexagons. Also, the centers for both series of ellipses will fall on substantially the same circle. There is also disclosed the tools which can be employed to form both the external and internal configurations in accordance with the invention.

32 Claims, 7 Drawing Sheets

ELLIPTICAL LOBED DRIVE SYSTEM

BACKGROUND OF THE INVENTION

The present invention relates to an improved drive system wherein a first component applies a driving torque to a second component, such as for example a threaded fastener and driver combination.

Designers and engineers have experimented with various configurations for torque transmitting drive systems. These drive systems may be employed in various types of applications wherein it is desired to transmit torque from one component to another. A particular application for which the present invention was primarily developed and with regard to which the following description relates, is the driving of threaded fasteners, such as screws and bolts.

The prior art is replete with various forms or designs of drive systems where one component is recessed while the other is provided with a complementary shaped projection for disposition in the recess. In this regard, either the recessed member or the projecting member may be the drive tool, and correspondingly the driven member may be provided with either a recess or a complementary shaped projection. By way of example, attention is invited to U.S. Pat. No. 2,397,216 to Stellin, dated Mar. 26, 1946 which discloses numerous forms or shapes of drive systems. Attention is also directed to U.S. Pat. No. 3,584,667 which illustrates a drive system which has gained wide acceptance in the automotive, aerospace and appliance industries and which is marketed under the brand name TORX ®. In addition, of course, there are other well-known hex-type drive systems, as well as cruciform-type drive systems such as the PHILLIPS ® drive system. Finally, there are systems which utilize various splined configurations somewhat along the lines of the above-referenced TORX ® drive system. Representative samples of the splined-type system can be found in U.S. Pat. No. 3,888,480 to Herman G. Muenchinger dated May 27, 1975; U.S. Pat. No. 2,803,092 to J. R. Richer, dated Jun. 8, 1937; U.S. Pat. No. 2,969,250, dated Jan. 24, 1961 to F. R. Kull and U.S. Pat. No, 4,006,660 dated Feb. 8, 1977 to Yamamoto et al.

The various drive systems of the prior art have been designed with a view toward handling of the forces created during driving of the fastener. In this regard, a vector analysis of the forces generated indicates that a component of the applied force will be directed radially outwardly, while a second component will be directed tangentially. It is only the tangential component of the applied force which serves to rotate or drive the fastener, viz., is converted to driving torque. As a term of art, designers often reference the system "drive angle", which is defined by the angle made by a line tangent to the point of driver contact at the point of application and a radial line through the fastener or drive tool per se. Generally speaking, the lower the "drive angle", the more efficient the drive system in that the "drive angle" determines the amount of applied force that is directed tangentially and thus is converted to driving torque. Further, it has also been found that with the drive angle that exceeds a certain value, as for example 60°, the torque loss is excessive. That is, most of the applied force will be directed radially, with only a small tangential component. This situation is to be avoided, as an excessively large radial component can severely damage the socketed component of the drive system.

The prior art systems using a multiplicity of splines which are of a relatively square configuration, will attain a low drive angle, zero or less, i.e. a negative angle or at zero. These designs, however, have not proven practical in service, nor in production. These types of drive systems are difficult and expensive to produce and often require special machining operations. Most importantly, the square corners result in stress risers which can lead to fatigue failure over extended periods of use. As to the spline-type drive systems which utilize a plurality of oppositely curved surfaces which are uniformly deployed about the 360° circumference of the components to form an alternating series of lobes and flutes, these drive systems overcome some of the problems inherent in square spline systems mentioned above, but are not generally capable of attaining a low drive angle, i.e. less than five degrees. That is to say, upon the application of extremely high torque, a radial force component will be created which can lead to socket failure or a tendency to shear or wipe out the lobe configurations.

To a great extent, the problems with the prior art splined type designs were overcome with the TORX ® drive system as disclosed in U.S. Pat. No. 3,584,667. This drive system employs a hexlobular configuration based upon mating arcuate surfaces designed to attain drive angles within the range of 10°-20°. While the TORX ® brand drive system was an advance in the art and has proven extremely beneficial and satisfactory in service, there are certain aspects of this system that could be improved. In one respect, as the manufacturing tolerances vary due to tool wear or to other variances in the dimensions of the forming tools for the fastener and driver surfaces, the point of contact between the fastener and driver will move inwardly or outwardly along the curved surfaces, thus altering the drive angle.

In addition, as the point of contact moves radially outward, bit or drive tool strength is sacrificed. More specifically, the strength of the drive tool lobes is directly related to the axial cross-section through the lobe at the point of contact. It can be appreciated that with this prior art type drive tool, shown in FIG. 8, as the point of contact moves outwardly, the axial cross-sectional area through the lobe at the point of contact will decrease, resulting in a decrease in bit strength, viz. the tools ability to transmit high torque values without the lobes shearing or failing. As will become clear from the discussion to follow, with the design of the present invention, the point of contact remains relatively constant. Thus, variances or tolerances encountered in manufacturing of the drive system components will not materially alter or adversely affect the strength of the bit.

Also, with extremely small sizes, there is a tendency for the lobes on either the fastener or driver to deform under operating conditions. In addition, where the fastener is provided with an internal recess or socket and the driver is the male member of the drive system, it is not always possible to obtain sufficient driver strength for long-term operation.

SUMMARY OF THE PRESENT INVENTION

The present invention is an improvement upon the prior art drive systems as discussed briefly above, and most importantly builds and improves upon the advances in the art provided by the TORX ® drive system of U.S. Pat. No. 3,584,667. More specifically, the present invention provides a drive system configuration for a two component torque transmitting system wherein both the driver and driven surfaces are formed by a first series of elliptically curved surfaces with a second series of elliptically curved surfaces alternating therewith. One series of elliptically curved surfaces, either the first or the second series is convexed while the other, alternating series of surfaces is concaved. The alternating concaved and convexed elliptically curved surfaces merge smoothly and tangentially to define a series of alternating flutes and lobes. Both the lobes and flutes are elliptically curved in section. Preferably, the centers of the elliptically curved lobes and correspondingly the centers of the elliptically curved flutes are disposed at the apexes of regular hexagons, although not the same hexagon, due to the alternating nature of these components.

It should be noted that as disclosed with respect to the drawings, one of the components of the drive system will be internally recessed while the other is provided with an external configuration of corresponding mating shape. It can be appreciated, that due to manufacturing tolerances and the need for slight clearance to permit the mating engagement of the external or projecting member within the recess, the configuration of the externally configured or male component varies slightly from that of the internally configured or socketed component. More specifically, while it is preferred that the recessed or internally configured component will have flutes and lobes defined by ellipse configurations of generally conforming dimensions, this is not possible with respect to the external member. More specifically, in order for the externally configured member to be received within the recessed component, it is necessary for the external lobes to be of a somewhat smaller dimension than the internal flutes of the recessed member, and correspondingly the external flutes must be of a larger dimension than the internal lobes of the recessed component. This is necessitated by the fact that the external lobes are received within the internal flutes and correspondingly that the internal lobes are received within the external flutes. Thus, while it is possible to maintain the elliptically configured lobes and flutes on one of the components (viz. the socket or the externally configured member) of relatively uniform or like elliptical configuration, this is not practical with respect to both components. Thus, while the term "similarly configured" or the equivalent, will be used hereinafter, it is to be understood that production tolerances and variances must be taken into account to insure that the externally configured member can be received within the corresponding recess or socket, or that a socketed tool can be engaged over an externally configured driving head.

The elliptical configuration of the present invention provides unexpected, improved results not only in the attainment of an extremely low drive angle, on the order of from $+2\frac{1}{2}$ to $-2\frac{1}{2}$, but it has been found that tolerance variations in the elliptical configuration of the present invention do not produce wide variances in the point of contact between the drive tool and fastener components. Thus, not only does the point of contact remain relatively constant even though tolerance variations are encountered, but also the drive angle will remain within a relatively narrow range approximating zero degrees, as noted above. Also of significance, is the fact that the elliptical configuration permits the employment of an externally configured member with increased strength over other splined drive systems of the type and kind discussed above. Finally, with the employment of an extremely low drive angle, there is required less depth of engagement between the lobes and flutes of the respective internal and externally configured components, thus higher driving forces can be accommodated with smaller driving heads and tools as will become clear from the description that follows. Also, it is believed that due to the high efficiency of the system in converting applied force to driving torque, the depth of penetration or the extent to which the driver is axially engaged in the recess is reduced with respect to prior art designs, thus, permitting smaller components thus requiring less metal or raw material in the overall fabrication of the drive system components.

It is therefore a primary object of the present invention to provide a new and improved drive system or coupling unit, as well as tooling designs for fabricating such units which can be manufactured with present day technology without excessive expense and which is extremely efficient in the converting of applied force to driving torque. A further object of the invention is to provide an improved drive system for a fastener, which permits the fastener to be driven with prior art tooling, if necessary.

BRIEF DESCRIPTION OF THE DRAWINGS

The drawings illustrate a preferred form of the invention wherein the elliptical lobed drive system is employed in conjunction with a fastener and driver combination. Also, these drawings illustrate the overall or basic geometry wherein the elliptically curved configuration is employed to produce a six-lobed or hexlobular arrangement. It is not intended that the invention be limited to the specific embodiments shown in the drawings, as the drive system may be used in applications other than fasteners, and a lobular configuration other than hexlobular may be employed. With the above in mind.

DESCRIPTION OF THE ILLUSTRATED EMBODIMENTS

A preferred embodiment of the present invention is illustrated in FIGS. 1-7 and the invention will be primarily described with respect thereto. Alternate embodiments are shown in FIGS. 9-20 which also utilizes the basic concept of the present invention. After the detailed discussion of the preferred embodiment to follow, a further discussion will be had with respect to the illustrated alternate or modified forms of the invention, as well as other modifications of the invention which are not shown but which will become apparent or be suggested to one skilled in the art once the overall basic concept of the invention is known. Also, as noted above, the invention will be described in conjunction with a fastener drive system. It is to be noted, however, that the invention may be used in any torque transmission or torque coupling application, wherein a driving unit is employed to transmit torque to a complementary shaped driven unit.

With respect to the fastener and drive tool arrangement to be discussed hereinafter, the drawings, FIGS. 1-7 illustrate a particular application of the invention wherein the fastener is provided with a recess or socket having an internal configuration in accordance with the principles of the invention, while the complementary externally shaped component is in the form of a drive tool. Those skilled in the art will readily realize, as shown in FIGS. 12-17, that this situation could be reversed in that the fastener could employ the external configuration in accordance with the invention while the drive tool would be in the form of a socket type element having a complimentary internal configuration.

Figure 1:
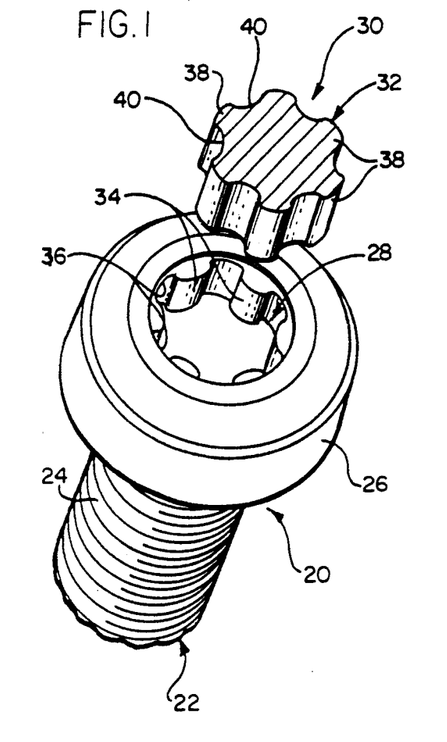
FIG. 1 is a perspective view of a fastener and drive tool having a drive system configuration in accordance with the present invention.
Figure 2:
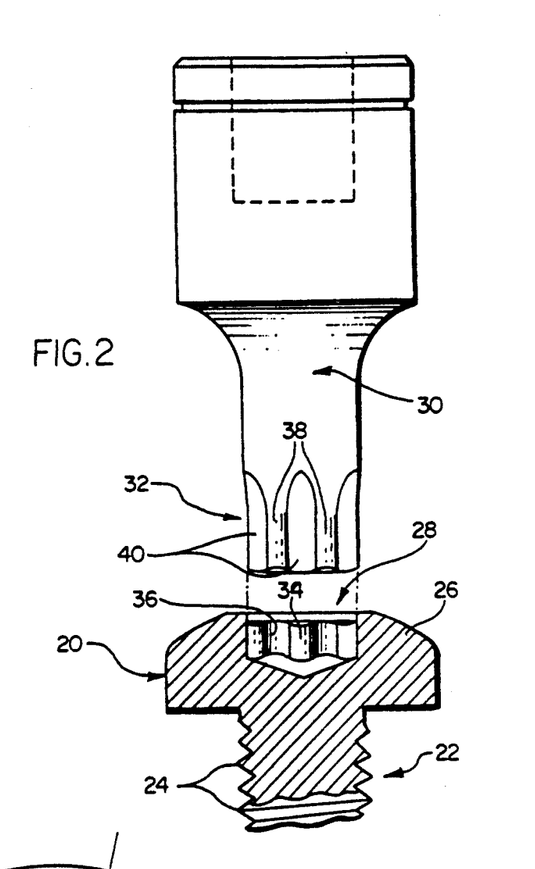
FIG. 2 is an elevational view of the fastener and driver of FIG. 1, with the fastener in section.

Directing attention to FIGS. 1 and 2, there is illustrated a fastener and drive tool arrangement in accordance with the concepts of the present invention. The fastener is designated generally 20, and includes an elongate shank 22 having a thread 24 formed thereon. An end of the fastener 20 is provided with an enlarged or headed portion 26 having a recess or drive socket 28 formed therein. A drive tool 30 is also illustrated, which has an end portion 32 that is configured to a complementary shape to the socket 28 and is thus engagable therein such that said drive tool can impart driving forces to the fastener 20. The recess or socket 28 has an internal configuration which is defined by a series of alternating elliptically curved lobes 34 and elliptically curved flutes 36. The lobes 34 are directed radially inwardly while the flutes 36 are oppositely formed, thus, defining what is referred to hereinafter as the internal configuration of the drive system of the invention. The flutes 36 and lobes 34 are equally spaced around the circumference of the socket wall and in the illustrated embodiment six series of lobes 34 and flutes 36 are provided.

The drive tool 30 is of a complementary, although not completely identical shape in that the drive tip or end portion 32 is externally configured to provide a series of external or outwardly directed elliptically curved lobes 38 and oppositely directed elliptically curved flutes 40. As will become apparent from the discussion to follow with respect to FIGS. 3 and 7, in order for the drive tool end portion 32 to be easily received within the socket 28 and yet be effective when in driving engagement, the flutes and lobes on drive tip 32 must be dimensioned for a clearance fit. Also, in order to attain the desired driving engagement and depth of engagement between the mating lobes and flutes, the shape of the drive tip must be altered slightly so that the lobes 38 are received within the flutes 36 of the socket recess to a specific extent and correspondingly the lobes 34 of the socket recess are received within the flutes 40 of the drive tool, in order to attain a desired depth of engagement between the respective flutes and lobes. This depth of engagement is indicated at 35 in FIG. 3. Thus, while the flutes and lobes on the drive tool are complementary to the internal configuration of the drive socket 28 it will be appreciated that for practical reasons they cannot be of an identical shape, nor can the ellipses which define the shape of lobes 38 and flutes 40 be equal or uniform.

Figure 3:
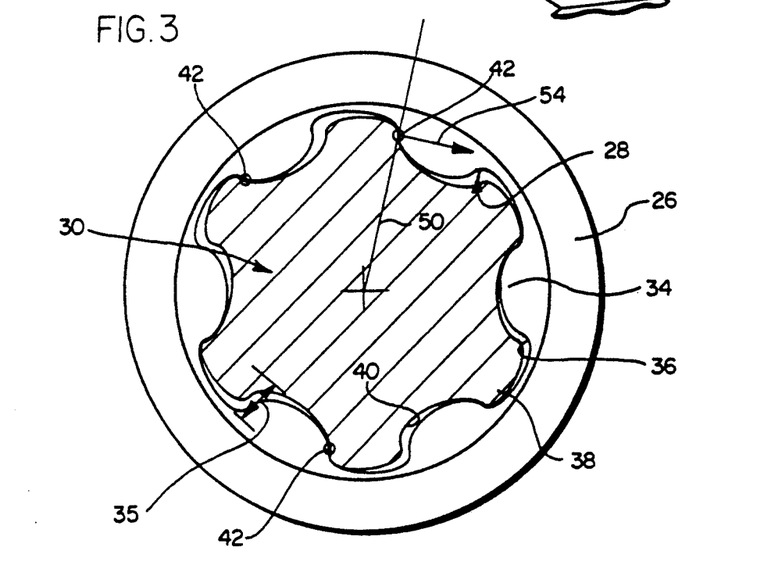
FIG. 3 is a sectional view illustrating the engagement of a driver in a fastener recess, wherein the drive and driven surfaces on the respective components are configured in accordance with the present invention.

FIG. 3 is an illustration of the drive tool end portion 32 engaged in socket 28. As can be seen, the lobes 38 on the driver are received within the flutes 36 provided by the internal configuration of the socket 28. Correspondingly, the lobes 34 on the internal configuration of the socket 28 are received in the flutes 40 of the drive tool end portion. The depth of engagement of the respective lobes and flutes is indicated at 35. In both situations, a degree of clearance is provided. As such, upon rotation of the drive tool 30, the drive tool lobes 38 will engage the lobes 34 on the internal configuration of the socket at location 42, thus imparting driving force to the fastener 20. The line 50 is a line tangent to the elliptical surfaces at the point of contact 42, as will be discussed.

As noted above, it is desirable with respect to a fastener drive system to attain a relatively low drive angle. In this regard, the drive angle is in effect the measure of efficiency of the drive system. If the drive angle is zero or close to zero, as is the case with the present invention, the system is extremely efficient and virtually all of the applied force is directed perpendicular to a line passing along the radius of the component and as such, the entire applied force is converted to driving torque. On the other hand, if the drive angle is materially greater than zero or is negative, then only a portion or component of the applied force is directed perpendicular to a radial line and converted into driving torque. An additional portion or component of the applied force will be directed either radially outward for a positive drive angle, or radially inward for a negative drive angle, and is of no use in driving the fastener, and in fact, has a detrimental effect. As it can be appreciated, it is desired to keep any radial component at a minimum, so that the major portion of the applied force is converted to driving torque. An excessively positive drive angle is extremely undesirable, as this will result in a substantial radially outward directed component which can place undue stress on the socket and can lead to stress failure or slippage during driving. Radially inwardly directed forces can be tolerated to a greater extent than can radially outward directed forces, however, in order to maintain maximum efficiency, it is desired to have the drive angle at zero or as close thereto as possible with manufacturing tolerance so that all of the applied force is directed perpendicular to a radial line and is thus converted to driving torque.

The term "drive angle" is essentially a term of art and is normally defined as an angle made by the intersection of a radial line and a line tangent to the point of contact on the driver. Attention is invited to FIG. 8, in this regard.

It should be noted, that with a zero drive angle, there is no intersection between the tangential line and the radial line, as these lines are parallel or co-extensive, which is the situation as shown in FIG. 3. That is to say, the line 50 which is tangent to the point of contact at 42 of the surface of lobes 38, also lies on or corresponds to a radial line through the center of the socket, such that all of the applied force, as indicated by the arrow 54, is directed perpendicular to said radial line 50 and as such, is converted entirely into driving torque. A better understanding of the concept of the "drive angle" can be had with respect to a drive arrangement wherein the drive angle is greater than zero, such as illustrated in FIG. 8.

Figure 8:
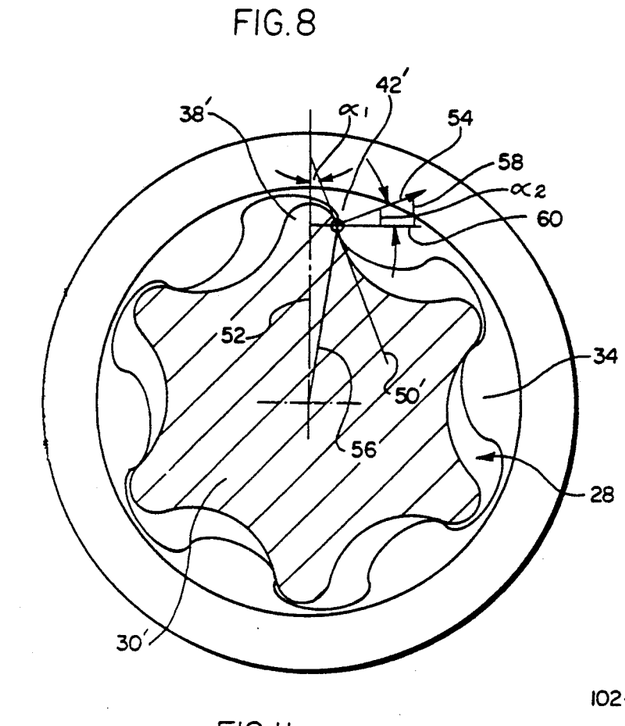
FIG. 8 is a view similar to FIG. 2, but illustrating the manner in which a prior art type of driver can be used to service a fastener having a recess fabricated in accordance with the present invention.

In FIG. 8 there is shown an arrangement wherein a prior art type of driver 30' is used to service the socket 28 fabricated with elliptical curved lobes 34 and flutes 36 in accordance with the present invention. In this regard, the driver which is designated 30' is configured in accordance with the conventional well-known TORX ® brand drive system and includes a plurality of driving lobes 38' which are in engagement with the internal recess elliptical lobes 34 at a location 42'. In this regard, a line 50' tangent to the point 42' is shown which line intersects a radial line 52 to form a drive angle alpha$_1$. The angle alpha$_1$ is the conventional drive angle and is approximately 10°-20° with the employment of driver 30'. The drive angle may also be measured with respect to a vector analysis of the applied force 54. In this regard, the force 54 applied to the fastener lobes 34 at location 42' is disposed perpendicular to the tangential line 50'. The force 54 can be broken up into its radial component 58 and the component 60 which is directed perpendicular to the radial line 56. The true drive angle thus is the angle alpha$_2$ formed by the force vector 54 and the tangential vector 60. This angle will be approximately equal to angle alpha$_1$. Also, it will be noted that a third angle, alpha$_3$, is formed by the tangential line 50' and the radial line 56 to the point of contact or tangency 42'. This angle, alpha$_3$ is equal to and corresponds to alpha$_2$, and as such the angle, alpha$_3$, is also a measure of the drive angle of the system.

Figure 5:
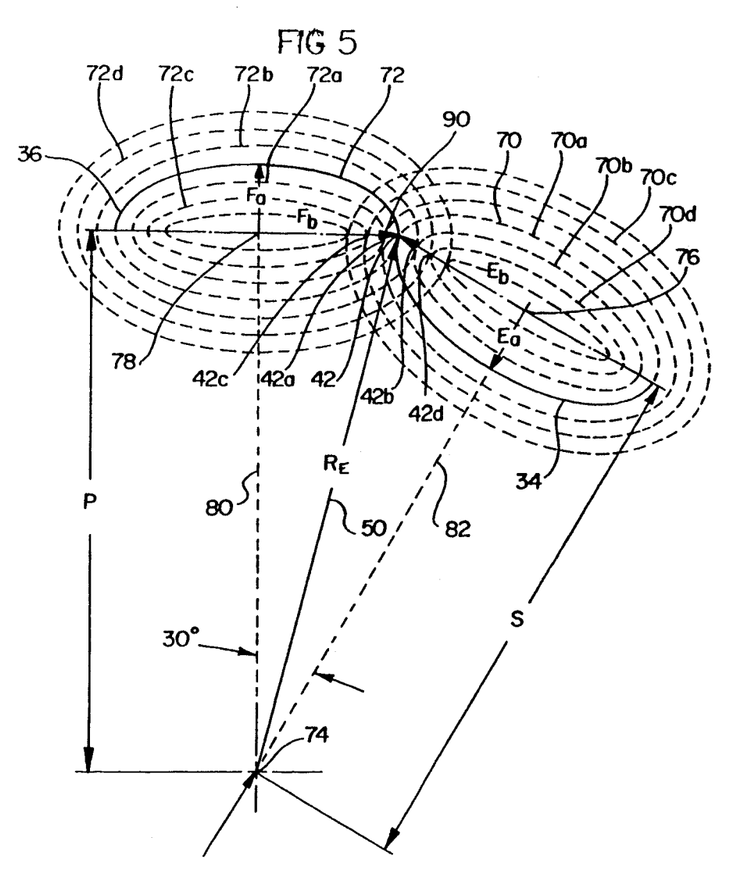
FIG. 5 is a portion of the diagrammatic sketch of FIG. 4 enlarged for clarity and discussion.

With respect to FIG. 3, the radial line 50 is tangent to the elliptical surfaces which define the internal lobe 34 and adjacent flute 36, as will be clear from FIG. 5. Thus, it can be seen that the force 54 is applied perpendicular to the radial line 50 and that the drive angle will be zero. It can be further appreciated from the above analysis, that when the line tangent to the point of contact extends through the axial center of the component, that the drive angle will be zero and the entire applied force is converted to driving torque.

There are numerous prior art designs which will permit the attainment of a zero degree drive angle. These designs, however, are spline-like configurations wherein the splines are formed by relatively square or sharp corners. As discussed above, the use of square or sharp corners is undesirable. The present invention improves upon the prior art by permitting the attainment of a zero drive angle with an arcuate configuration.

As will be explained more fully hereinafter, the various lobes and flutes of the drive surfaces constructed in accordance with the present invention are provided or defined by a series of elliptically curved surfaces. More specifically, there is provided a first series of elliptically curved surfaces with a second series of elliptically curved surfaces alternating therewith and being oppositely disposed, with the elliptically curved surfaces merging generally tangentially and smoothly. As such, one series of curved surfaces is convexed while the other is concaved, thereby defining the alternating internal flutes 36 and lobes 34 and the external lobes 38 and flutes 40 illustrated in the drawings discussed to this point. The geometry or specifics of the elliptical configurations which provide the elliptically curved surfaces will now be discussed in greater detail with regard to FIGS. 4-7.

Figure 4:
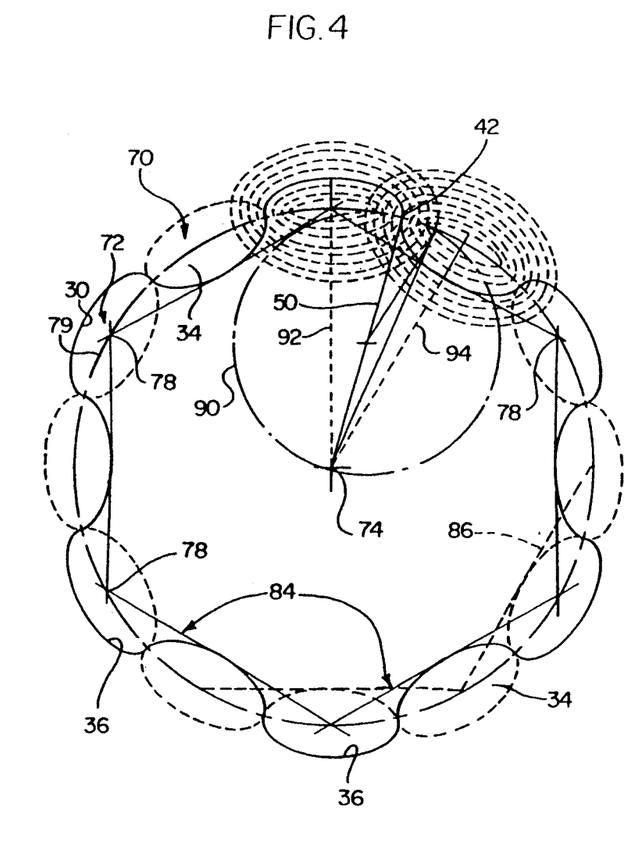
FIG. 4 is a diagrammatic sketch illustrating the configuration or geometry of a preferred internal recess design and the dimensional aspects thereof.
Figure 6:
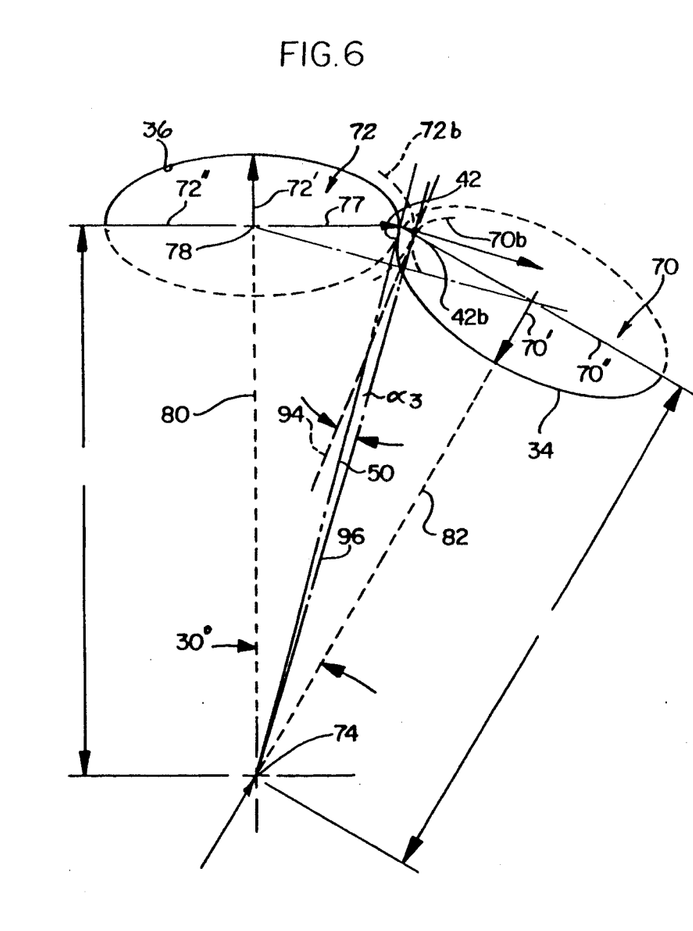
FIG. 6 is a diagrammatic sketch similar to FIG. 5 illustrating the overall geometry or configuration of the ellipse of the elliptical configuration of the lobes and flutes on the internally configured component or fastener of the embodiment of FIGS. 1 and 2.

Attention is initially invited to FIGS. 4-6 where there is shown schematically or diagrammatically the geometry which is utilized in defining the elliptically curved internally disposed surfaces of the socket recess 28 for the drive system in accordance with the present invention. FIG. 4 is a diagrammatic illustration of the entire internal configuration of the recess 28, while FIG. 5 is an enlarged portion of the upper segment thereof which has been enlarged for discussion and understanding. In FIG. 5 various dotted or phantom lines are employed which illustrate the tolerances as well as alternate elliptical configurations for the elliptical surfaces, as will be explained. FIG. 6 is a view similar to FIG. 5, wherein the dotted or phantom lines have been removed, and only the full lines representing the elliptically curved lobes 34 and flutes 36 are shown.

Looking to FIG. 4, there is shown the geometry of the recess or socketed portion 28 of the fastener drive system, which defines the alternating elliptically curved lobes and flutes 34 and 36, respectively. As can be seen, each lobe and flute is generally formed from an elliptical configuration or ellipse and the elliptically curved surface portion, shown in full line, merges smoothly and tangentially with the adjacent elliptical surface of the lobe or flute on opposite sides thereof. There is thus provided two series of alternating elliptical surfaces. The first series is defined by ellipses which are designated generally 70 and are the ellipses used to generate the elliptically curved lobes 34. The second series of ellipses are each designated generally 72, and provide the elliptically curved surfaces that define the flutes 36.

An ellipse is generally defined as an oval or closed plane curve generated by a point moving in such a manner that the sums of its distances from two fixed points or foci is a constant. Elliptical surfaces or a surface which closely approximate a true ellipse may also be generated by using pairs of circular arcs. This method is often used by machinist, and while the resulting surfaces are not true elliptical surfaces, they are satisfactory for all practical purposes. Accordingly, as used herein elliptically curved surfaces or an elliptical configuration is intended to cover not only true ellipses, but also surfaces that approximate an elliptical configuration. Ellipses as such, are comprised generally of a center or centroid and a major and a minor axes. For a better understanding of the geometry of the ellipse, attention is directed to FIG. 6. When there is shown a representation of the ellipses 70 and 72 and the corresponding elliptically curved lobes 34 and flutes 36 formed thereby. There is also illustrated a central axis point 74 which corresponds to the axis 74 of the recess as illustrated in FIG. 4. The center of the ellipses 70 and 72 are designated 76 and 78, respectively. Each ellipse has a minor axis designated 70' and 72' and a major axes 70'' and 72''. In the preferred, illustrated form of the invention, the internal recess 28 is formed with the elliptically curved lobes 34 and flutes 36 being generated from ellipses 70 and 72 which are essentially of the same or uniform configuration. That is to say, for the preferred embodiment illustrated in full line, the minor axes 70' and 72' are equal as are the major axes 70'' and 72''. This relationship of course would not apply to the alternate configuration illustrated in dotted or phantom outline. In addition, the centers 76 and 78 of the respective ellipses fall on the circumference of the same circle 79, FIG. 4. As such, the radii 80 and 82 are equal, that is the distance from central point 74 to the centroid of ellipse 70 is the same as the distance from central axis point 74 to the centroid of ellipse 72. The respective ellipse 70 and 72 merge tangentially with each other at point 42 which corresponds to the contact point.

As such, the centroid 76 and 78 of the respective elliptical configurations 70 and 72 will thus fall on the circumference of a circle 79, the radius of which is the distance 80/82. Also, as illustrated in FIG. 4, the centers of the elliptical configuration 72 fall at the apexes of a regular hexagon, which hexagon is designated generally 84. Correspondingly, the centers 76 for the series of elliptical surfaces 70 which form the lobes 34 also fall at the apexes of a second regular hexagon 86. For purposes of illustration, only a portion of the hexagon 86 is shown and is shown in dotted outline.

Attention is now directed to FIG. 5 which is a figure similar to FIG. 6 but includes in addition to the ellipses 70 and 72 which define elliptically curved flutes 36 and lobes 34, a series of alternate ellipses shown in dotted outline. As noted above, the ellipses 70 and 72 which define surfaces 34 and 36 are of equal or similar configuration. That is to say, the major and minor axes are equal. FIG. 5 illustrates in dotted or phantom outline alternate sets of ellipses which can be generated about the center centroids 76 and 78 to provide the internal elliptically curved lobe and flute configuration. The major and minor axes of the alternate, adjacent ellipses are not equal, although the ellipses are generated about the same centroids. That is to say, if one of the elliptical configurations as shown in dotted outline in FIG. 5 were employed to generate the surfaces which define the inwardly directed lobes 34 and flutes 36 of the recess 28, the flutes and lobes would not be of equal configuration or dimension.

Thus, instead of the inwardly directed elliptically curved lobe 34 and flute 36 being formed from the ellipses 70 and 72, they may be formed from alternate pairs of ellipses, such as 70a and 72a; 70b and 72b; 70c and 72c; or 70d and 72d, as for example. In this regard, the ellipses 70a and 70c are larger than the preferred elliptical configuration 70, while ellipses 70b and 70d are incrementally smaller. The same holds true with respect to the mating series of ellipses 72 in that ellipses 72a and 72c will be slightly smaller than the preferred ellipse 72 while the corresponding ellipses 72b and 72d are larger. It is believed that the significance of the various elliptical configurations will become clearer from the further discussion of FIG. 5 that follows.

The dotted outlines of the alternate series of ellipses shown in FIG. 5 is somewhat diagrammatic in that it can be appreciated that an infinite number of series of ellipses could be fabricating, depending upon the increment between the various ellipses. The dotted outlines also represent the manufacturing tolerances which might be encountered, although the tolerances certainly would not be as great as the variance illustrated in the drawing, and would probably fall within the framework of the ellipses 70a and 70b; 72a and 72b.

The critical feature here, is the point of tangential merging of the respective ellipses of a given pair, as for example 70a; 72a. It can be seen that the full line portions of ellipses 70 and 72 which represent the surfaces of the elliptically curved lobes 34 and flutes 36, respectively, merge tangentially at point 42. Correspondingly, the alternate series of ellipses 70a and 72a and the hypothetical surfaces generated therefrom will merge smoothly and tangentially at the point 42a; while ellipses 70b and 72b merge at point 42b and correspondingly the series of ellipses 70c and 72c; 70d and 72d will merge tangentially at points 42c and 42d, respectively. It should be noted that the tangency points 42, 42a, 42b, 42c, 42d fall along an arc 90 which can best be appreciated from FIG. 4. Thus, it can be seen that as tolerances, or dimensional variations may be encountered in the manufacturing of the drive system components, the point of tangency or point of engagement on a drive tool having the resulting elliptically curved surfaces will remain relatively constant in a radial direction. Thus, any manufacturing tolerances which may be encountered will not materially affect the resulting drive angle of the drive system. That is to say, that given the tolerances that may be encountered, a line tangent to the point of tangential merging (42, 42a, 42b) would still remain generally radially oriented, or would differ from the radial orientation only slightly, on the order of two and one-half degrees ($2\frac{1}{2}°$) given maximum encountered manufacturing tolerances. Also of importance here is that since the point of tangency, which approximates the point of engagement or contact on the drive tool, does not move radially outward, bit or tool strength will not be affected by manufacturing tolerances. More specifically, as discussed above since the point of engagements 42, 42a, 42b, etc. are at the same radial position, the area of an axial cross-section through the lobes 34 remains relatively constant irrespective of the tolerances or variances encountered.

For a better understanding of this concept, attention is invited to FIG. 6 wherein the alternate ellipse 70b and 72b have been shown in partial dotted outline. These ellipses merge tangentially at point 42b. A line 94 is disposed tangent to the ellipse 70b and 72b at point 42b, which line 94 intersects a radial line 96 to point 42b to form a drive angle, alpha 3, which is slightly greater than zero, on the order of two and one-half degrees (2½°). Thus, since the ellipse 70b an 72b in effect illustrate or define the maximum manufacturing tolerances in one direction, the drive angle alpha 3 would be the maximum variation from the desired zero drive angle. With prior art designs, tolerance variations produce a more dramatic or severe effect in that the variation in drive angle can change to a greater degree with tolerance variation.

Accordingly, it is believed clear that whatever manufacturing tolerances that might be encountered will not materially alter to any great extent the drive angle attained with the elliptically curved drive system of the present invention. Also, as will be discussed hereinafter, and as can be appreciated by comparing FIGS. 3 and 8, the present drive system permits the elliptically curved lobes 38 on the driver 30 to be formed to a greater cross-sectional area than those of the prior art driver 30', and thus lobes 38 are stronger than the lobes 38'.

To appreciate fully the geometry of the situation as illustrated in FIG. 5 with respect to the arc 90, attention is again directed to FIG. 4 wherein the full circle 90 generated along said arc is shown. It can be seen that the radius of this circle 90 is approximately ½ the radius of the circle 79 upon which the centers of the various ellipses 70 and 72 lie. Also, it should be noted that since the preferred embodiment employs a hexlobular configuration, the respective centroids are displaced by an angle of approximately 30°.

The above-discussed geometry, wherein the ellipses 70 and 72 used to generate the surfaces for the lobes 34 and flutes 36 are of an equal or conforming configuration. It should be realized, that the nature of the ellipses 70 and 72 is to a great extent determined by the ratio of the ellipse minor axis 70' (72') to the major axis 70" (72"), as this ratio will to a great extent determine the depth of the flutes 36 and correspondingly the degree of extension of the lobes 34 into the mating flutes 40 on the drive, that is, the depth of engagement 35, FIG. 3. As illustrated in FIGS. 4 and 6, the ratio of the minor axis 70' to the major axis 70" is approximately 0.500 while the ratios for the ellipses 70a; 70b; 70c; and 70d will vary upwardly or downwardly depending upon the configuration thereof as can be appreciated from FIG. 5. The ratio as noted above has been selected emperically as a ratio that not only attains a low drive angle, but a ratio that will provide compatibility with the prior art driver 30' as shown in FIG. 8. In actuality, it has also been emperically determined, that when the ratio of the minor axis 70' to the major axis 70" is 0.658, a drive angle of zero will be attained, over all ranges of manufacturing tolerances and the center of circle 90 will be coincident with the center or axis 74. The ratio of approximately 0.500, has been selected as to compromise, as this ratio allows not only the attainment of an extremely low drive angle, less than two and one-half degrees, but also provides compatibility with the prior art TORX ® type driver 30' of FIG. 8.

Figure 7:
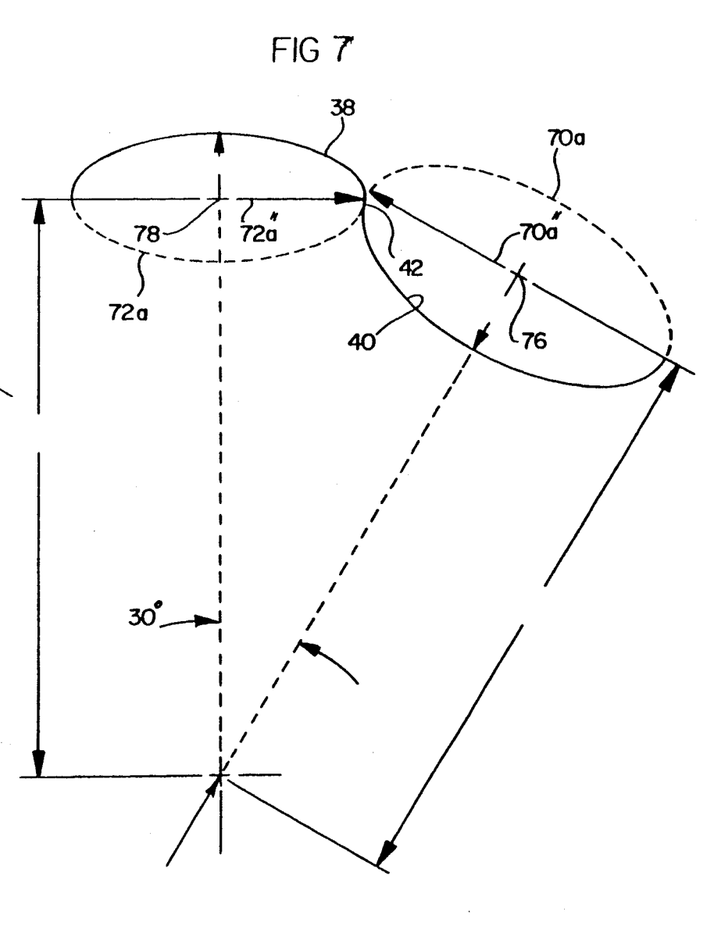
FIG. 7 is a view similar to view to FIG. 6, illustrating the configuration of the elliptical configuration of the flutes and lobes on the externally configured component, namely the driver of FIGS. 1 and 2.

Attention is now directed to FIGS. 3 and 7 with respect to the driver 30. In this regard, it will be recalled from the prior discussion that the elliptically curved flutes and lobes 36 and 34 of the internally configured arrangement of the invention as discussed previously with regard to FIGS. 3–6, were constructed from ellipses 70 and 72 of approximately equal configuration. It will also be appreciated from viewing FIG. 3, that it is necessary for the externally configured elliptically curved lobes 38 on the driver to be slightly smaller than the flutes 36 of the internally configured socket 28. Correspondingly, the elliptically curved flutes 40 on the driver must be slightly larger than the lobes 34 of the socket. The geometry for the ellipses which generates the external lobes 38 and corresponding flutes 40 is shown in FIG. 7.

It is preferred, that the ellipse which generates the external lobe 38 be generated about approximately the same centroid 78 as that which generated the internal flute 36. Correspondingly, the ellipse which is used to generate the external flute 40 is generated about approximately the same centroid 76 which was used to generate the internal lobe 34. In practice, the ellipses as shown in FIG. 7 will correspond approximately to the pair of ellipses 72a and 70a of FIG. 5. It can be appreciated in this regard that the width of the external lobe 38 which is determined by the major axis 72a" will be less than the width of the flute 36 determined by major axis 72". On the other hand, the major axis 70a" generating the external flute 40 will be greater than the major axis 70"which generates the internal lobe 34. As such, a sufficient degree of clearance is provided to permit the engagement of the driver end tip 32 within the socket 28 while assuring that upon rotation of the driver to bring the external lobe 38 of the driver into engagement with the internal lobe 34 of the recess, that engagement will occur approximately at the point 42 which is the point at which the respective elliptically curved surfaces merge tangentially.

Alternate forms of the invention, as well as tooling for fabricating the internally configured and externally configured surfaces of the drive system are shown in the remaining figures. In this regard, it should be noted that FIGS. 12–16 illustrate a modified form of the invention, wherein the fastener is provided with an externally configured drive surface. It is preferred, but not absolutely necessary to employ the concept of uniform ellipses for generating the external flutes and lobes on the fastener as will be discussed more fully hereinafter. The socket which is utilized to drive the external type fasteners of FIGS. 12 and 14, will then have internal flutes and lobes which are sized for mating engagement, that is, the internal lobes will be slightly smaller than the external lobes so that they may be received within the corresponding external flutes. The internal flutes correspondingly, will be slightly larger to receive the external lobes.

Figure 9:
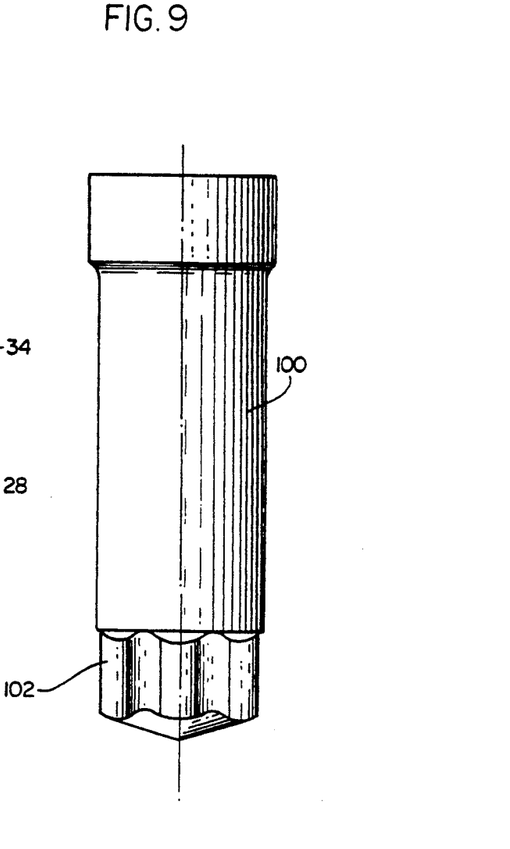
FIG. 9 is a plan view of tooling in the form of a punch for forming the internally configured drive surfaces of the present invention, viz., the recess or socket of the fastener of FIG. 1.
Figure 10:
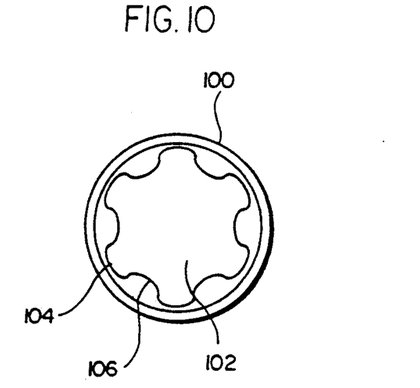
FIG. 10 is an end view of the punch of FIG. 9.
Figure 11:
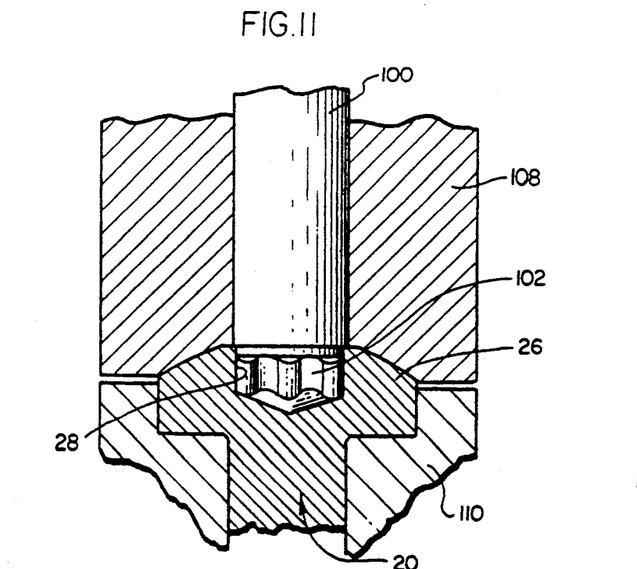
FIG. 11 is a sectional view illustrating how the punch of FIG. 9 is used with other tooling to form the fastener drive recess.

Looking first to FIGS. 9-11, FIG. 9 illustrates a punch 100 which can be used to fabricate the internal configuration of the drive system of the present invention. The punch 100 has a working end surface 102 which will be configured as illustrated in FIG. 10. More specifically, the punch will have a series of radially disposed, externally directed lobes 104 which are elliptically curved, and alternating therewith will be a corresponding series of elliptically curved flutes 106.

The manner in which the punch is utilized to form the recess 28 in the head 26 of the fastener 20 is illustrated in FIG. 11. In this regard, prior to the formation of the thread 24 on the shank 22, the fastener is placed in a two-piece fixture 108; 110. The punch 100 is received within the upper fixture element 108 and will engage and cold form the recess 28 into the head 26 of the fastener. During this operation, the head of the fastener 26 is also formed to its final configuration by the corresponding surfaces of the tool elements 108 and 110, as illustrated.

Figure 12:
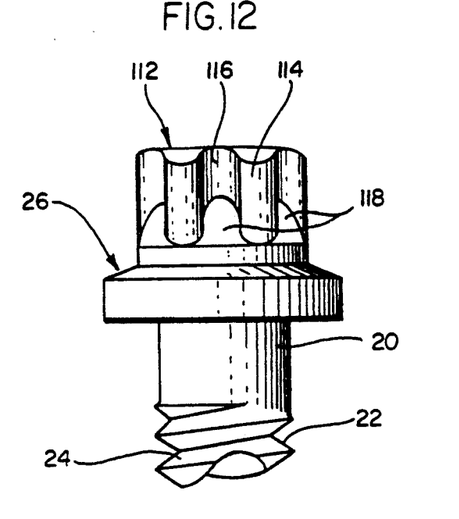
FIG. 12 is an elevational view of a fastener with an externally configured drive surfaces in accordance with the invention.
Figure 13:
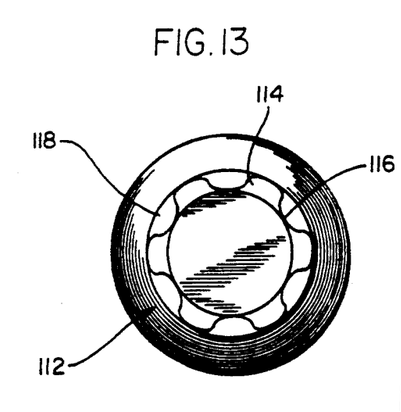
FIG. 13 is an end view of the fastener of FIG. 12.

FIG. 12 illustrates the employment of the present invention on an externally configured drive system for a fastener. The fastener is indicated 20 and has a shank 22 with a thread 24 formed thereon. The head of the fastener designated generally 26 instead of being provided with the recess 28 as shown in FIG. 2, has an externally configured projection 112, and end view of which is shown in FIG. 13.

The drive surfaces on the projection 112 are provided by a series of radially disposed external elliptically curved lobes 114 with alternating opposingly disposed elliptically curved flutes 116. As mentioned previously, with the embodiment as shown in FIGS. 12 and 13, and also as that in FIGS. 14 and 15, the elliptically curved lobes 114 and flutes 116 are generated from ellipses which are approximately equal or of conforming configuration. Intermediate the lobes 114 and generally disposed within the flutes 116 are tapered shoulders 118. These shoulders extend from the outer periphery of the projection 112 and project generally axially upwardly and radially inwardly and serve to strengthen or support the lobes 114. The extent of the shoulders 118 would be something less than one-half the axial dimension of the lobes 114.

Figure 14:
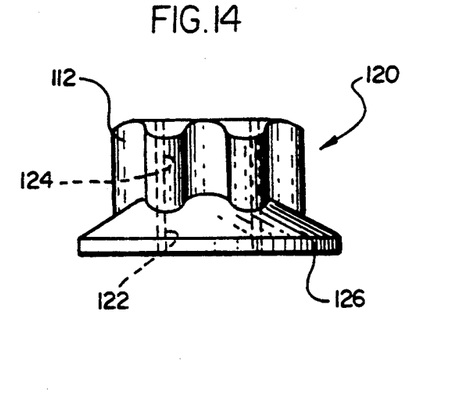
FIG. 14 is an elevational view of a nut having externally configured drive surfaces in accordance with the present invention.
Figure 15:
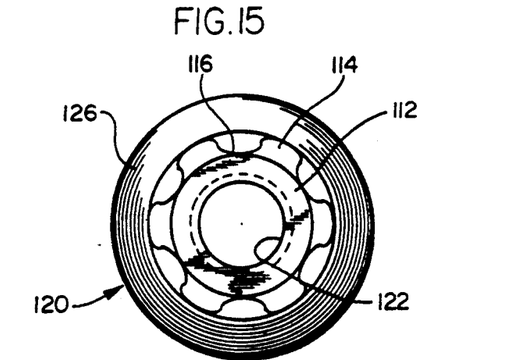
FIG. 15 is an end view of the nut of FIG. 14.

In FIGS. 14 and 15, there is illustrated a nut member designated generally 120 having an external configuration in accordance with the present invention. In this regard, the nut member 120 includes an internal bore 122 which is provided with an internal thread 124 in a manner well-known in the art. Nut member 120 includes a conically shaped skirt 126 from which a projection 112 extends, similar to that as discussed with respect to FIGS. 12 and 13. The projection 112 includes a series of alternating lobes and flutes 114 and 116 which are elliptically curved in accordance with the principals of the invention as discussed above, and are formed from ellipses having approximately conforming dimensional characteristics.

Figure 16:
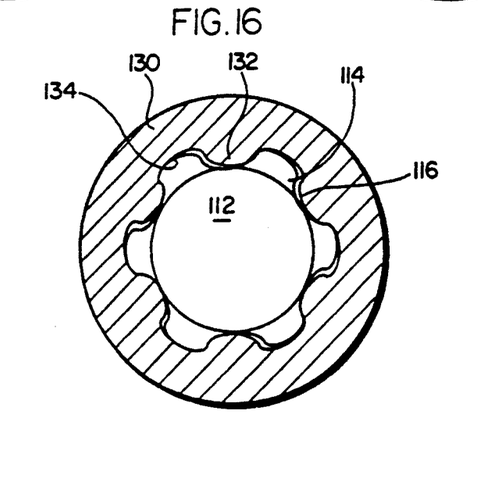
FIG. 16 is a view, illustrating a fastener with an external drive configuration in accordance with present invention in full line, and a mating internally configured socket, shown in section.

FIG. 16 is a view partially in section, and illustrates the engagement of a socket member 130 over the external projection 112 of FIGS. 12 or 14. The socket 130 is provided with a corresponding internally configured surface in accordance with the principles of the present invention. That is to say, the internal surface of the socket 130 is defined by an alternating series of elliptically curved lobes 132 and flutes 134 which are shaped for mating engagement with the elliptically curved lobes 114 and flutes 116 on the external head 112, which are of approximately equal or conforming dimension. As mentioned previously, the lobes 132 and flutes 134 will be configured to permit attainment of the mating engagement. That is to say, the internally directed elliptically curved lobe 132 will be slightly smaller than the external elliptically curved flute 116, and correspondingly, the internal flute 134 will be slightly greater than the external lobe 114. Thus, while the flutes and lobes 114 and 116 on the external head 112 will be configured from approximately equal elliptical configurations, the lobes and flutes 132 and 134 on the internal surface of the socket 130 will be configured from ellipses of differing geometry. This arrangement is illustrated in FIG. 19.

Figures 17, 18, 19:
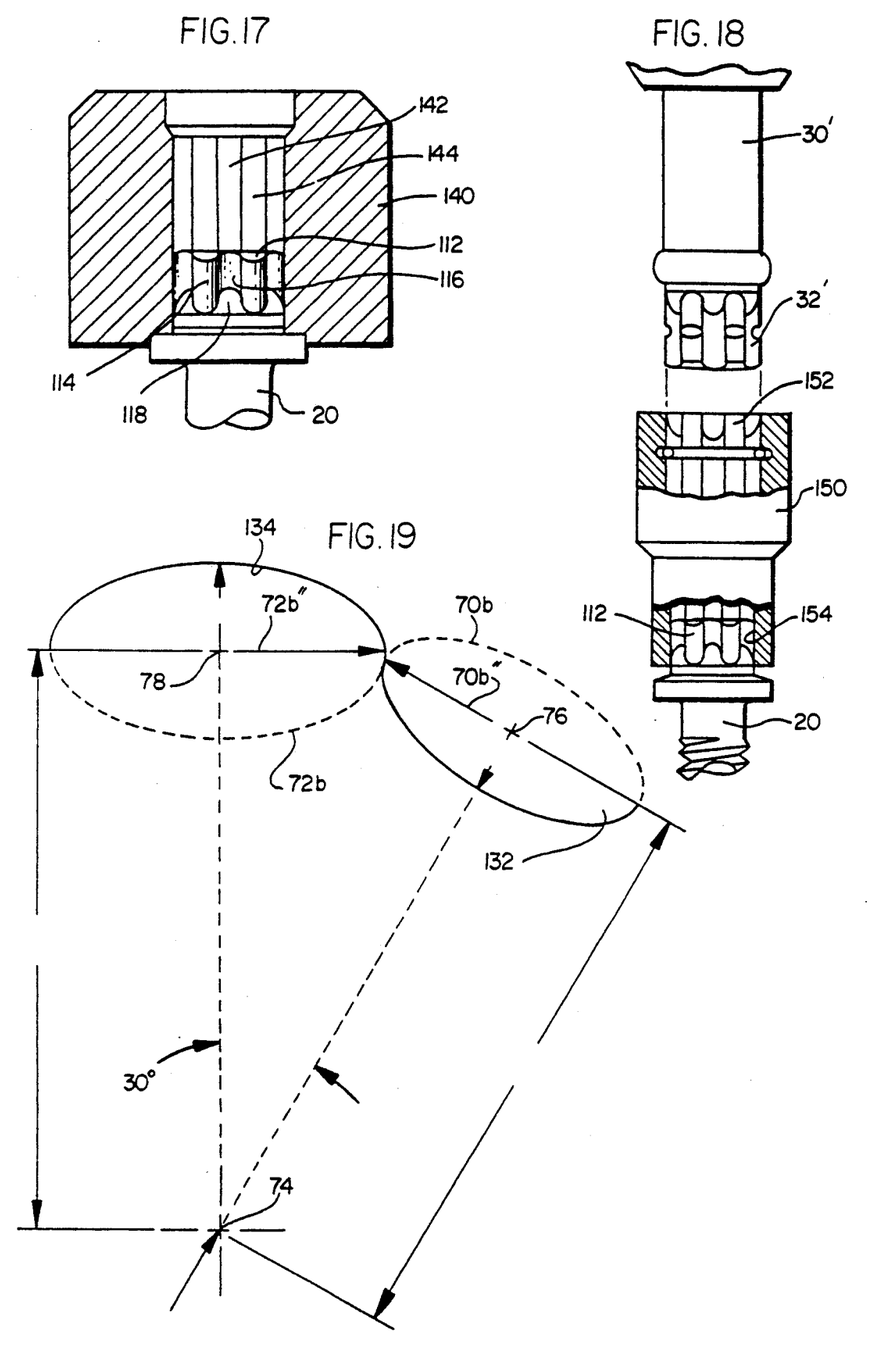
FIG. 17 is an elevational view partially in section illustration tooling in the form of an extruding punch for forming the external configuration of the components of the drive system of the present invention.
FIG. 18 is an elevational view, partially in section showing a fastener as a driven unit, with a coupling unit between the fastener and a drive tool component.
FIG. 19 is a view similar to FIGS. 6 and 7, but illustrating the geometry of a socket that would be used with a fastener, or the like, having an externally configured drive surface formed with elliptically curved surface generated from similar uniform ellipses.

Directing attention to FIG. 19, the internal lobe 132 and adjacent internal flute 134 are illustrated in full line. The ellipses from which the elliptically curved surfaces of the lobe 132 and flute 134 are formed are illustrated and designated 72$b$ and 70$b$. In this regard, the ellipses 70$b$ and 72$b$ correspond generally to the ellipses as shown in dotted outline in FIG. 5. In this regard, it will be appreciated that the major axis 72$b''$ for the ellipse which generates the flute 134 is larger than the major axis 70$b''$ for the ellipse which is used to generate the internally directed elliptically curved lobe 132. As mentioned above, these dimensions are required in order to permit the socket 130 to be engaged over the externally configured projection 112 which has lobes and flutes that are configured from equal ellipses.

FIG. 17 illustrates an extruding punch, designated generally 140, which can be used to fabricate the external projection 112 on the fastener of FIG. 12 or the nut of FIG. 14. In this regard, the extruding punch 140 will be provided with an internal configuration made up a series of alternating flutes and lobes oppositely formed with respect to those on the projection 112. The internal surface of the extruding punch 140 will have a series of radially disposed, inwardly projecting elliptically curved lobes 142 and an alternating series of flutes 144 which are used to form the corresponding lobes and flutes 114 and 116 on the projection 112. In order for the flutes and lobes 142 and 144 to produce the desired configuration for the lobes and flutes 114 and 116, they will also have to be generated approximately from ellipses of equal configuration. One skilled in the art will readily appreciate, that if an extruding punch such as the punch 140 is used to fabricate a driver tool similar to that as illustrated in FIGS. 2 and 3, the lobes and flutes 142 and 144 would have to be adjusted in order to attain the desired final configuration for the drive tip 32. In this instance, the lobes and flutes 142 and 144 would not be generated from equal ellipses, but would be generated approximately from elliptical configurations generally to that as shown in FIG. 7.

In FIG. 18, a fastener similar to fastener 20 of FIG. 12 is being driven by a drive tool 30 by means of an adapter 150. The drive tool 30' has an end portion 32' having flutes and lobes thereon preferably generated from unequal ellipses in a manner similar to that employed with respect to the tool 30 of FIG. 2. The driving head 112 is preferably in accordance with the prior discussion with respect to FIG. 12, wherein the lobes and flutes thereon are generated from equal ellipses. The adapter 150 can be utilized in the transmission of torque from the drive tool 30' to the fastener 20 even though the tip 32' is externally configured, as is the driving head 112 on the fastener 20. The adapter with opposite socketed ends 152 and 154. Each end is internally configured in a manner similar to the socket 130 to provide internally directed flutes and lobes for mating engagement with the flutes and lobes on the external configuration of the driver 32 or correspondingly the driving head 112 as the case may be.

Figure 20:
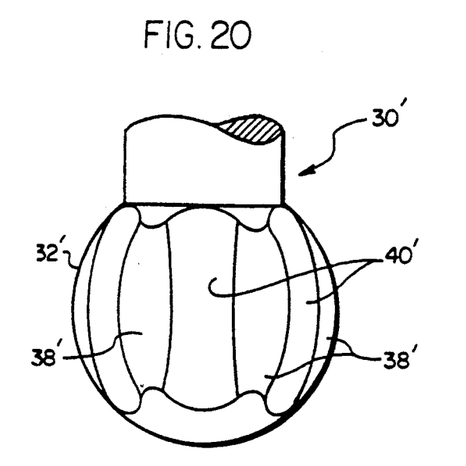
FIG. 20 is a partial elevational view of a ball-type drive tool employing the elliptically curved drive system of the present invention.
Figure 21:
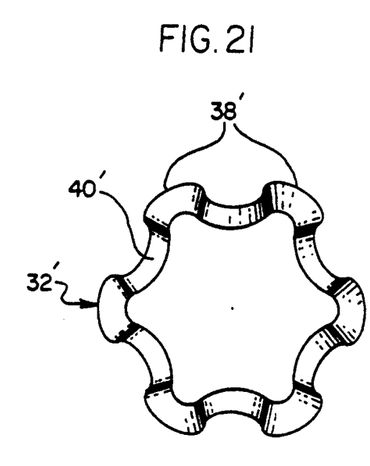
FIG. 21 is an end view of the ball-type driver of FIG. 20.

Attention is invited to FIGS. 20 and 21 which illustrate an alternate form of drive tool 30'. Unlike the drive tool 30 wherein the elliptically curved flutes 38 and lobes 40 extend generally parallel to the drive tool axis and are relatively straight, drive tool 30' has a fastener engaging end portion 32' which is spherical in shape. Ball or spherical-type drivers are well known in the art and permit the driving of a fastener without the need for axial alignment between the driver and fastener. The ball or spherical driver 30' of the present invention employs a series of elliptically curved lobes 38' and flutes 40' disposed about the exterior of the driving head or end portion 32'. The lobes and flutes 38' and 40' are constructed from essentially the same geometry as the driver 30, in that the flutes 40' and lobes 38 are formed from unequal ellipses in the manner as discussed with regard to tool 30, and FIGS. 3 and 7. In addition, the lobes 38' and flutes 40' are arcuately curved in the axial direction in order to conform to the spherical outer surface of the end portion 32'.

Figure 22:
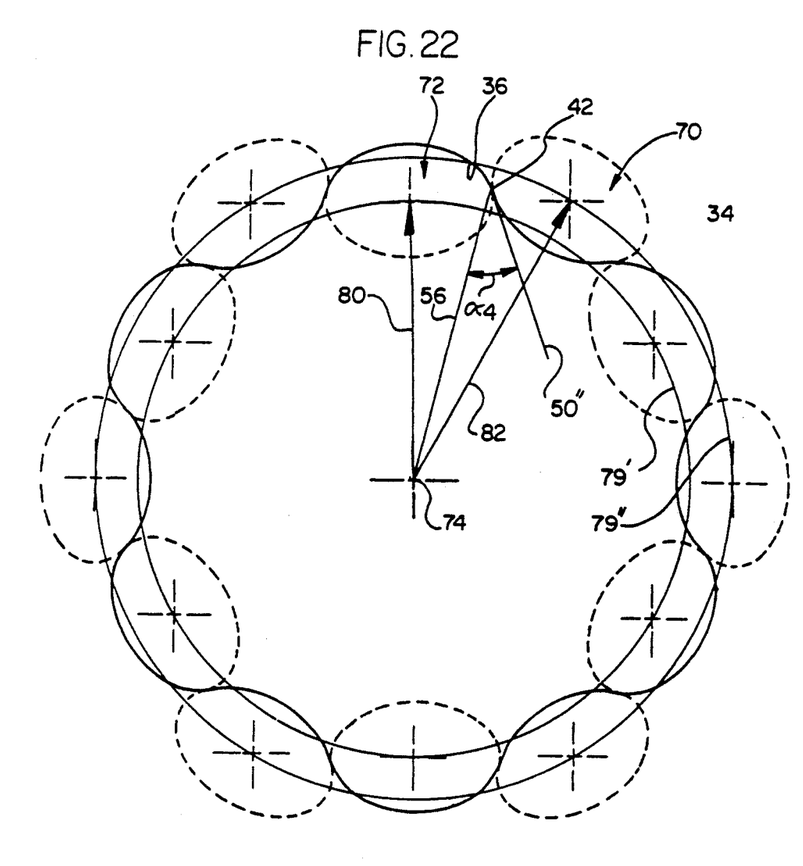
FIG. 22 is a view similar to FIG. 4 illustrating a modified geometry for a lobed drive system, wherein the ellipses are equal, but with centers on circles of differing radii.

FIG. 22 is a diagrammatic representation of an alternate or modified form of the invention, and is similar to FIG. 4. The embodiment of FIG. 20 differs in that while the ellipses 70 and 72 which generate the elliptically curved lobes 34 and flutes 36 are equal, however, the respective radii 80 and 82 to the centers of the ellipses are not equal, and as such, fall on circles 79' and 79". The point of tangency 42 with this embodiment is moved slightly radially outward along the elliptical curves 70 and 72. As such, a tangent line 50" will form a drive angel alpha 4 with radial line 56 to the tangency point 42. The drive angle alpha 4 is on the order of fifteen degrees, plus-or-minus five degrees. Thus, while not as efficient as the embodiment of FIGS. 1-7, the embodiment of FIG. 22 still attains a drive angel as efficient as the prior art, yet provides increased driver strength due to the enlarged cross-sectional area of the driver lobes.

It should be noted further, that movement of the point of contact 42 along the ellipses 70, 72 will materially affect the drive angle. This fact serves to highlight or emphasize the significance of the present invention as illustrated in FIG. 5, wherein tolerance variations will not result in a material change in the point of contact nor the drive angle. Also, it should be noted that while the embodiment of FIG. 22 has equal ellipses, alternate unequal ellipses, such as shown in FIG. 5 in phantom outline may also be employed. In addition, while the ellipses 70 and 72 of all the embodiments have been shown with the minor axes 72' and 70' disposed radially, it would be possible to orient one or both series of ellipses with the major axes 72" or 70" disposed radially with respect to center 74.

The drive system of the present invention has been described generally and conceptually with regard to the embodiment as illustrated in FIGS. 1-8. In addition there has also been illustrated tooling for forming the externally and internally configured components of the system, FIGS. 9-11 and FIG. 17. There is also illustrated modified forms of the invention, FIGS. 12-16, wherein the fastener is provided with an externally configured driving head adapted to be driven with an internally configured socket member. Those skilled in the art will realize that the concept of the present invention may be adapted to numerous other modifications. In this regard, it should be noted further that the present invention was also described conceptually with respect to an arrangement wherein the ellipses which generate the various elliptically curved surfaces for the flutes and lobes, whether externally or internally configured, lie upon a common circle. That is to say, with reference to FIG. 4, that the radius of the centroid of the various ellipses 80 and 82 are equal. It will be appreciated, from FIG. 20 that the concept of the present invention may also be adapted to a situation wherein the radii 80 and 82 are unequal. That is to say, that the centroid of one of the series of ellipses is disposed radially outward to a greater extent than the centers of the corresponding series of ellipses. Also, while the invention has been illustrated with respect to a six-lobed or hexlobular arrangement, more or less lobes could be employed, yet formed to an elliptically curved configuration. It is to be noted that those skilled in the art and possessed of the present disclosure of the invention will conceive numerous modifications and variations based upon this inventive concept. In so far as these modifications and variations are covered by the claims appended hereto, they shall be deemed to fall within the spirit and scope of the invention.

We claim:

1. An article of manufacture for use in a torque transmitting system or the fabrication of components for such a system, comprising a body including an axis and a portion thereon being defined by a first series of elliptically curved surfaces and a second series of elliptically curved surfaces alternating with said first series of elliptically curved surfaces, said first series of elliptically curved surfaces being convexed, while the second series of elliptically curved surfaces alternating therewith being concaved, with the adjacent surfaces of said first and second series merging generally tangentially, each said elliptically curved surface of said first and second series being generated from a central point, with the central points of said first series and the central points of said second series conforming generally to the apexes of regular hexagons, and all of said elliptically curved surfaces of said first series being generated from ellipses of substantially the same dimension, and all of said elliptical curved surfaces of said second series being generated from ellipses of the same dimension, and wherein the centers of said first series of elliptically curved surfaces and the centers of said second series of elliptically curved surfaces fall substantially along the circumference of a common circle whose center is at the axis of said body.

2. An article of manufacture according to claim 1, wherein the ellipses from which said first and second series of elliptically curved surfaces are generated are of substantially the same dimension.

3. An article of manufacture according to claim 1, wherein the ellipses from which said first and second series of elliptically curved surfaces are generated, are of slightly different dimensions.

4. An article of manufacture according to claim 1, wherein said first and second series of elliptically curved surfaces define an internal socket configuration, such that said first series of surfaces define inwardly extending elliptically curved lobes while said second series of surfaces define inwardly opening elliptically curved flutes said flutes and lobes alternating about the axis of said body.

5. An article of manufacture according to claim 1, wherein said first series of surfaces define outwardly extending elliptical curved lobes, while said second series of surfaces define outwardly opening elliptically curved flutes said flutes and lobes alternating about the axis of said body.

6. An article of manufacture according to claim 1, wherein said article is a fastener having a driving head thereon, which driving head has a socket which provides said portion defined by said first and second series of elliptically curved surfaces.

7. An article as claimed in claim 1, wherein said article is a fastener having a driving head thereon, which driving head has an external configuration providing said portion defined by said first and second series of elliptically curved surfaces.

8. An article as claimed in claim 1, wherein said article is a forming tool for forming corresponding series of elliptically curved surfaces upon a component member.

9. An article according to claim 8, wherein said forming tool has an externally configured surface provided by said first and second series of elliptically curved surfaces for forming an internally configured surface on said component member.

10. An article according to claim 8, wherein said forming tool has an internally configured surface provided by said first and second series of elliptically curved surfaces, for forming corresponding externally configured surfaces on said component member.

11. An article according to claim 1, wherein said article is a drive tool for engaging a correspondingly shaped drive member.

12. An article according to claim 11, wherein said drive tool has an external configuration provided by said first and second series of elliptically curved surfaces.

13. An article according to claim 11, wherein said drive tool has a socket with the inner surface thereof provided by said first and second series of elliptically curved surfaces.

14. A fastener including a threaded shank and a driving head, said driving head having an axis and driving surfaces formed thereon, wherein said surfaces are comprised of a first series of elliptically curved surfaces and a second series of elliptically curved surfaces alternating with the elliptically curved surfaces of said first series, said first series of elliptically curved surfaces being convex while said second series of elliptically curved surfaces are concave, said adjacent elliptically curved surfaces of said first and second series merging generally tangentially, and each said elliptically curved surface of said first and second series being generated from a center point, with the center points of said first series conforming generally to the apexes of a regular hexagon, and the center points of said second surfaces also conforming generally to the apexes of a regular hexagon, and all of said convexed elliptically curved surfaces of said first series being generated from ellipses of substantially the same dimensions, while all of said concaved elliptically curved surfaces of said second series are generated from ellipses of similar dimensions, and wherein the center of said first series of elliptically curved surfaces and the centers of said second series of elliptically curved surfaces fall substantially along the circumference of a common circle whose center is on the axis of said fastener driving head.

15. A fastener according to claim 14, wherein the ellipses from which said first and second series of elliptically curved surfaces are generated are of substantially the same dimension.

16. A fastener according to claim 14, wherein the ellipses from which said first and second series of elliptically curved surfaces are generated are of slightly different dimension.

17. A fastener according to claim 14, wherein said head includes a recess and said elliptically curved surfaces of said first and second series define the internal wall surface of said recess, with said first series of surfaces defining a plurality of radially inwardly extending lobes while said second series of elliptically curves surfaces defining a plurality of radially disposed flute portions alternating with said lobes.

18. A fastener according to claim 14, wherein said head includes an external configuration, and said elliptically curved surfaces of said first and second series define the external configuration of said head, to provide a plurality of outwardly extending lobes and alternating flutes.

19. A fastener according to claim 18, further including tapered shoulder means disposed between said lobes and in said flutes.

20. A drive tool comprising a body having an axis and including a drive portion for engaging a fastener or the like in driving engagement, said drive portion having a first series of elliptically curved surfaces and a second series of elliptically curved surfaces formed thereon wherein said second series of elliptically curved surfaces alternates with the elliptically curved surfaces of said first series, said first series of elliptically curved surfaces being convexed while said second series of elliptically curved surfaces are concaved, and said adjacent surfaces of said first and second series merging generally tangentially, each said convexed elliptical curved surface of said first series being generated from a center point, with the center point of said first series of elliptically curved surfaces conforming generally to the apexes of a regular hexagon, and the elliptically curved surfaces of said second series also being generated from center points which conformed generally to the apexes of a regular hexagon, and all of said elliptically curved surface portions of said first series being generated from ellipses of substantially similar configuration, while all of said elliptically curved surfaces of said second series are generated from ellipses of substantially similar dimensions, and wherein the center of said first series of elliptically curved surfaces and the centers of said second series of elliptically curved surfaces fall substantially along the circumference of a common circle whose center is at the axis of said tool body.

21. A drive tool according to claim 20, wherein the ellipses from which said first and second series of elliptically curved surfaces are generated are of slightly different dimension.

22. A drive tool according to claim 20, wherein the ellipses from which said first and second series of surfaces are generated are of similar dimensions.

23. A drive tool according to claim 20, wherein said body portion of the drive tool includes an external wall surface configuration, with said first series of convexed elliptically curved surfaces defining a plurality of lobes radially disposed about said body portion and extending outwardly therefrom, while said second series of elliptically curved surfaces alternating therewith defining a plurality of radially disposed flutes disposed intermediate said lobes.

24. An article of manufacture for use in a torque transmitting system or the fabrication of components for such a system, comprising a body including an axis, and a portion thereon being defined by a first series of elliptically curved surfaces and a second series of elliptically curved surfaces alternating with said first series elliptically curved surfaces, said first series of elliptically curved surfaces being convexed, while the second series of elliptically curved surfaces alternating therewith being concaved with the adjacent surfaces of said first and second series merging generally tangentially, each said elliptically curved surface of said first and second series being generated from a central point, with the central points of said first series of elliptically curved surfaces falling on a common circle, and the centers of said second series also falling on a common circle, with the elliptically curved surfaces of said first series of surfaces being generated from ellipses of substantially equal dimensions, and the elliptically curved surfaces of the second series also being generated from ellipses of substantially equal dimensions, and wherein the center of said first series of elliptically curved surfaces and the centers of said second series of elliptically curved surfaces fall substantially along the circumference of a single common circle whose center is at the axis of said body.

25. An article according to claim 24, wherein the centers of said first series of elliptically curved surfaces conform to the apexes of a hexagon, as do the centers of said second series of elliptically curved surfaces.

26. An article of manufacture according to claim 24, wherein the ellipses from which said first and second series of elliptically curved surfaces are generated are of substantially the same configuration.

27. An article of manufacture according to claim 24, wherein the ellipses from which said first and second series of elliptically curved surfaces are generated are of slightly different configuration.

28. A torque transmitting system for a pair of components such as a fastener and a drive tool combination, comprising a drive surface configuration on a first one of said components to be driven and correspondingly shaped engagement surfaces on the other of said components to impart driving force to said first component, said drive surface configuration on said first component including a first series of elliptically curved surfaces and a second series of elliptically curved surfaces alternating with the elliptically curved surfaces of said first series, said first series of elliptically curved surfaces being convex to define a series of elliptically curved lobes while said second series of surfaces are concaved to define a series of elliptically curved flutes, and said elliptically curved surfaces of said first and second series merging generally tangentially with the adjacent elliptically curved surfaces, each said elliptically curved surface of said first series and said second series being generated from a center point, with the center points of said first series of elliptically curved surfaces falling on a common circle and the centers of said second series of elliptically curved surfaces falling on a second common circle, said second component having correspondingly shaped elliptically curved surfaces.

29. A torque transmitting system according to claim 28, wherein the elliptically curved surfaces on siad first component are generated from ellipses of substantially equal dimensions 30. A torque transmitting system according to claim 28, wherein the correspondingly shaped surfaces on said second component include a first series of convexed elliptically curved surfaces defining a plurality of lobes, with a second series of concave elliptically curved surfaces being disposed intermediate said lobes, the ellipses defining said lobes on said second component being smaller than the ellipses defining said concaved flute portions on said second component.

31. A torque transmitting system according to claim 28, wherein said first component includes six equally spaced flutes and lobes.

32. A torque transmitting system according to claim 28, wherein the common circle containing the centers of said first series of elliptically curved surface and the common circle containing the centers of said second series of elliptically curved surfaces coincide.

* * * * *